Dec. 16, 1952    J. JEROME    2,621,598
UNLOADER VALVE
Filed Nov. 28, 1949    2 SHEETS—SHEET 1

INVENTOR.
JACK JEROME
BY Howard J. Jeandron
ATTORNEY

Dec. 16, 1952  J. JEROME  2,621,598
UNLOADER VALVE
Filed Nov. 28, 1949  2 SHEETS—SHEET 2

INVENTOR.
JACK JEROME
BY
Howard J. Jeandron
ATTORNEY

Patented Dec. 16, 1952

2,621,598

UNITED STATES PATENT OFFICE 2,621,598

UNLOADER VALVE

Jack Jerome, Queens Village, N. Y., assignor to
Norman H. Schwarz, Lynbrook, N. Y.

Application November 28, 1949, Serial No. 129,797

6 Claims. (Cl. 103—42)

1

This invention relates to a pressure regulating valve and more particularly to a valve which automatically maintains a predetermined fluid pressure in a device such as an accumulator.

Pressure regulating valves are not new in the art as there are various forms of such valves but in this particular instance the pressure regulating valve and its combined accumulator fluid storage means are mounted within the fluid reservoir and the function of this particular combination is to store a large volume of hydraulic fluid at a predetermined pressure over a period of time with a small fluid pump. The discharge port from said accumulator may be connected to a fluid starter requiring a larger volume of fluid at the predetermined pressure than the pump is capable of supplying during the cycle or cycles of operations of the starter. It is understood that the accumulator is charged during normal engine idling time and the accumulator is sufficiently charged to provide the necessary energy for a normal engine starting operation.

The present invention is an improvement over the prior art in the combination of the pressure regulating valve and accumulator and a pilot operated "on-off" valve for controlling the discharge of fluid pressure at the desired working pressure.

It is an object of this invention to provide a compact unit in which the pressure regulating valve, the storage accumulator and the pilot operated "on-off" valve are combined to provide a compact efficient and economically constructed combination.

It is a further object of this invention to provide a pressure regulating valve having a relief valve connected to the pump inlet port to prevent overloading the valve and accumulator in the event of malfunctioning of the pressure regulating valve per se.

Another object of this invention is to provide a pressure regulating valve provided with a small velocity fluid pump and a large volume accumulator and in which the outlet port connected with said accumulator is provided with a pilot operated "on-off" valve, said valve permitting the storage of a large volume of fluid at a predetermined pressure over a long period of time while providing for the discharge of the stored fluid in a short period of time.

Other features of this invention may be apparent by reference to the accompanying description and the drawings in which Fig. 1 is a side elevational view of the valve, Fig. 2 is a cross sectional view taken on line 2—2 of Fig. 1,

2

Figure 1:
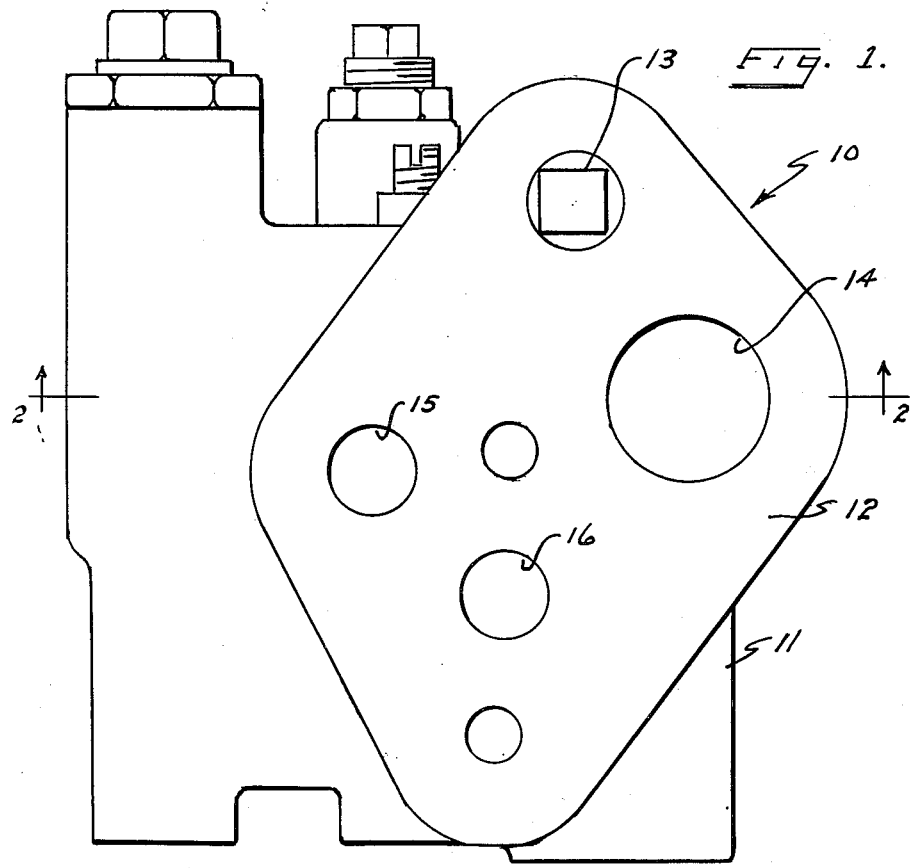

Referring to the drawings, there is illustrated a pressure regulating valve 10 (Fig. 1) comprised of a casing 11 having a mounting plate 12. The mounting 12 is normally bolted to the wall of a fluid reservoir (not shown), the mounting plate being provided with an extended control handle stem 13 that protrudes through the wall of the reservoir and a main motor port 14 that is connected through the wall of the fluid reservoir and an engine pump port 15 that is also connected through the wall of the reservoir and a hand pump port 16 connected through the wall of the reservoir. The valve casing 11 on the opposite face to the mounting plate 12 is provided with a port 17 that is connected to a fluid storage accumulator 18, the accumulator thus being entirely submerged within the reservoir (not shown).

Figure 2:
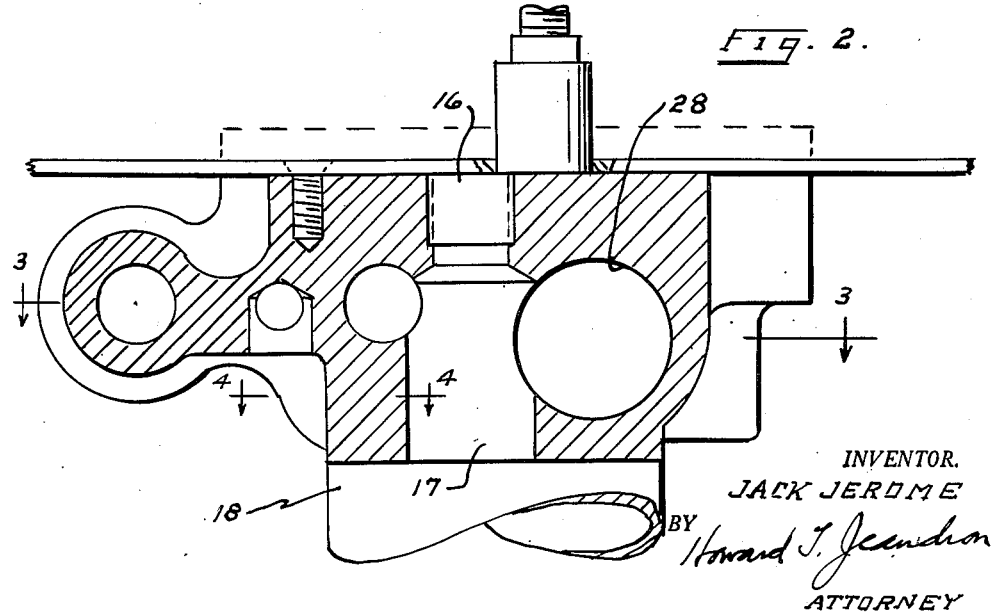
Figure 3:
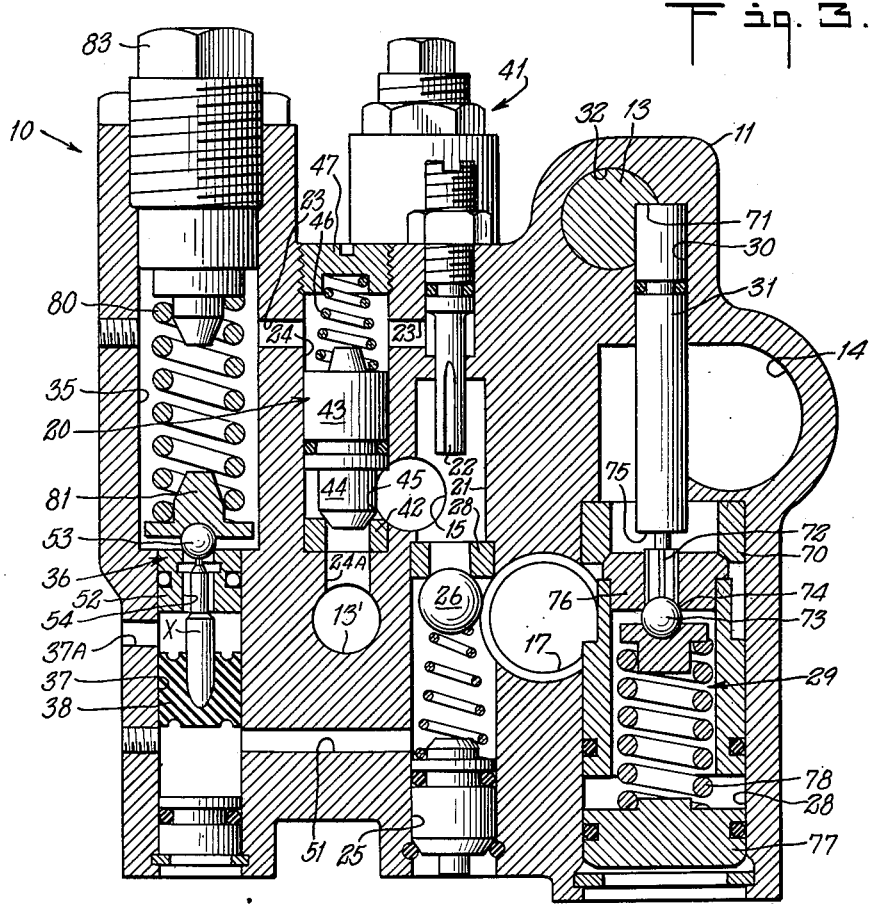
Fig. 3 is a cross sectional view taken on line 3—3 of Fig. 2.
Figure 4:
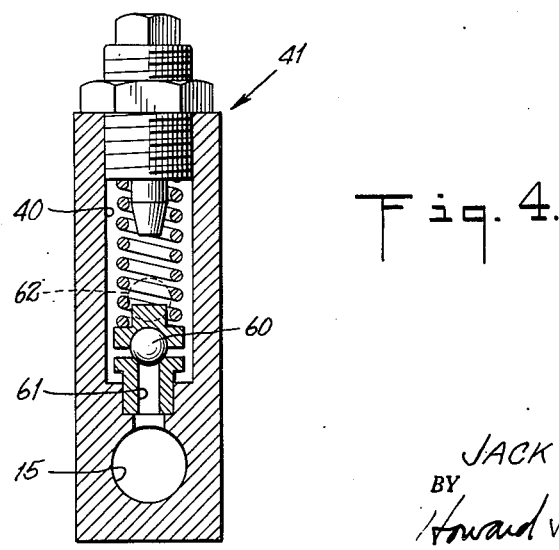
Fig. 4 is a cross sectional view taken on line 4—4 of Fig. 2.

Referring to Fig. 3, the various components of the pressure regulating valve 10 may be identified. The pressure port 15 extending through the body member 11 is connected on the one side to a main unloader poppet 20 mounted in a bore 24 and on its opposite side to a bore 21 in the main body member 11, the bore 21 being provided with an adjustable orifice 22 which is in turn connected through a passage 23 to the upper end of the bore 24 in which the main unloader poppet is mounted. The bore 21 at its lower end is connected to a bore 25 in which a check valve 26 is mounted. The bore 25 is in addition connected to the port 17 that extends through the main body member 11 and is connected to the fluid storage accumulator 18. The bore 17 is also connected on the opposite side of the main body member 11 to the port 16 (Fig. 2). The bore 17 is also connected to a bore 28. A pilot operated "on-off" valve 29 is mounted in the bore 28. The bore 28 is in turn connected to the port 14 and a bore 30 is provided for a valve stem 31 extending from the bore 28 upward and connected to a bore 32, the control handle stem 13 being mounted in the bore 32 to contact the end of the valve stem 31. The bore 23 which connected bore 21 with the main unloader poppet also extends through the body member 11 to connect with a bore 35 in which the unloader pilot valve 36 is mounted. The bore 35 at its lower end is connected with a smaller bore 37 in which a diaphragm 38 is mounted. The pump port 15 extends through the main body 11 and on the interior side of said body 11, the port 15 is connected to a bore 40 (Fig. 4) in which a relief valve 41 is mounted. Thus the various components of the valve may be located as illustrated in Figs. 2 and 3. To describe more specifically each of these components it being understood that the body member 11 in each instance provides the exterior structure within which the unit is mounted, the unloader poppet 20 includes a valve seat 42 mounted in the bore 24 and a reciprocating valve element 43 to slideably fit the bore 24. The lower extremity of element 43 is provided with a reduced radius extension 44 on which the valve face 45 is provided to mate with the valve seat 42. A bore 24A connects the valve seat 42 with an outlet bore 13 in the main body member 11. The upper portion of bore 24 is provided with a spring 46 and a cup shaped member 47, the cup shaped member 47 being secured in any manner in the bore 24. Thus the valve is normally spring pressed on its seat 42 and retained in a closed position. It must be noted that the reduced area of the valve surrounding element 44 is the portion connected directly to port 15 so that fluid pressure from the inlet port may pass into port 21 and when a predetermined pressure is reached, the fluid pressure will also act within bore 24 to lift the element 43 and the fluid entering bore 24 will be dumped past the unloader poppet into a bore 13 that is in turn connected to the reservoir. The fluid pressure entering port 15 will in addition pass into bore 21 lifting the check valve 26 from its valve seat 28 and the fluid will pass through to the port 17 charging into the accumulator 18. When the accumulator 18 has been charged with fluid pressure, the fluid pressure entering through port 15 will at the same time pass through the bore 21, pass the adjustable orifice 22 and through the passage 23 to the bore 35 as well as to the bore 24. The fluid pressure acting on the upper area of the poppet valve 43 will retain the unloader poppet on its seat 45 due to the greater total pressure above the piston 43. The unloader pilot valve 36 is also maintained in a balanced relationship that is as already stated, the fluid pressure passing through bore 23 to bore 35 acts on one side of the valve while fluid pressure passing the check valve 26 passes through a bore 51 in the casing 11 to the bore 37 acting on the lower face of the diaphragm 38. A serrated pin X is provided between the upper face of the diaphragm and the ball 53, the pin is serrated to allow fluid to pass when the ball 53 is lifted from its seat. Thus when the fluid pressure builds up on the lower face of the diaphragm to a maximum value, the fluid pressure on diaphragm 38 will force it upward causing the serrated pin X to move upward against a poppet ball 53 opening the communicating passage 54. This permits the fluid pressure in bores 35, 23, 24 to be dumped out through the discharge port 37A. At the same time the fluid pressure will act on the lower face of the unloader poppet 43 lifting the poppet valve from its seat 42 and dumping fluid pressure through bore 24A and out the port 13. It must also be noted that in the event of malfunctioning of the unloader poppet 43, the pump pressure entering port 15 cannot build up beyond a maximum value due to the relief valve 41 connected to port 15. Referring to Fig. 4, the fluid pressure from port 15 when it reaches a maximum will lift a poppet ball 60 and the fluid pressure will pass through a bore 61 and out a port 62 dumping into the reservoir. The foregoing description describes briefly the component parts and mode of operation that is the means of providing the maximum unloading pressure that may be retained by the storage accumulator and the minimum fluid pressure that may be attained by the storage accumulator at which time the poppet valve will again close and permit the fluid pump pressure from port 15 to again load or store the fluid pressure in the accumulator until a maximum pressure is again reached. Assuming that the fluid pressure has been delivered through port 15 and that the fluid storage accumulator 18 has been properly filled with fluid to a maximum pressure, the valve is then ready for its normal functioning in a system. In one application of this valve, the port 14 is connected to a fluid starter for diesel engines. In order that the fluid pressure stored at a maximum value in the accumulator may be utilized to produce a work stroke with the high pressure fluid that in volume is far in excess of the fluid rate delivered by the pump supplying fluid through port 15, the "on-off" valve 29 mounted in the bore 26 is normally retained in a closed sealed relationship with a valve seat 70 to retain the fluid pressure within the valve and storage accumulator connected thereto. This valve may be opened by a cam operation or otherwise, to quickly and effectively release the large volume of fluid pressure from port 17 past the valve seat 70 and out port 14 to the fluid motor to be operated. The means shown in this embodiment for operating valve 29 includes an operating handle 13 (Fig. 1) mounted in bore 32 that may be turned clockwise to open the valve 29 and counter-clockwise to permit valve 29 to be closed by its own balanced relationship and spring bias illustrated. The operating handle when rotated clockwise by means of its cam face 71 (Fig. 3) produces a downward pressure on the shaft 31 that is transmitted to a plunger 72 that in turn presses a pilot valve 73 lifting it from its seat 74 and at the same time the shaft 31 by means of its shoulders 75 bears on the valve face 76 of the valve 29 pressing the valve face 76 away from its valve seat 70 the fluid passing the valve seat 70 and passing through port 14 to the fluid motor, but at the same time fluid will pass around the pin 72 to the opposite side of valve 29 to produce a balanced relationship so that when handle 12 is rotated in an opposite direction (counterclockwise) shaft 31 will be lifted and the valve 76 will close due to the bias produced by a spring 78 mounted on the lower face of valve 29. The spring 78 being maintained in compression by the mounting plug 77. This balanced relationship is necessary otherwise the valve would not close when released.

It is apparent that the unloader poppet valve may be controlled by the unloader pilot valve to maintain a predetermined fluid pressure within the fluid storage accumulator, the pressure being determined by setting the unloader pilot valve that is in bore 35. There is provided a spring 80 that bears against the upper surface of an element 81 that retains the pilot poppet 53 in a sealed relation with the element 52. The spring 80 is in turn retained in the bore 35 by a threadably secured cap member 83. Member 83 may be turned clockwise to increase the pressure of the spring 80 or counter-clockwise to decrease the pressure of spring 80 and thus the pressure setting on the pilot valve may be maintained and desired predetermined pressure may readily be set with the element 83 working with the spring 80.

One of the features of this unit is the compact arrangement in which all interconnected elements have been mounted in a single casing or body 11. A further feature of this unit is the manner in which the diaphragm 38 has been securely affixed within the bore 37 to give a positive seal between the system pressure delivered to the face of the diaphragm 38 from the opposite side of the diaphragm that is ported to the reservoir to permit dumping fluid that may pass the pilot poppet 53. A serrated pin X allows the fluid dumped to pass into bore 37 and in turn out the bore 37A. A still further feature of this particular unit is the manner in which the system pressure and storage accumulator maximum pressure is protected by an additional relief valve 41 to prevent overloading the system or storage accumulator. A still further feature of this unit is the provision of an adjustable orifice 22 mounted in the bore 21. The orifice 22 is adjusted to maintain an opening although restricted to the smallest orifice permissible to provide the unbalanced fluid relation through bore 23 to bore 35 that is necessary to control the operation of the pilot valve 36.

Applicant's unloader valve is also designed in such a manner that its mounting within the fluid reservoir provides an efficient structure that is placed in an out of the way relation in that the storage accumulator is also within the reservoir and the complete structure is retained in a protected relationship inside of the reservoir. Whereas all of the prior installations of the valve and storage accumulator have been either the one or both mounted outside of the reservoir in an unprotected relationship.

In another embodiment, the valve 29 may not be combined, it may be located remotely from this valve, similarly the relief valve 41 although shown as a part of this valve, it may be separated from the valve without departing from the spirit of this invention.

Various changes and modifications may be made to the device as illustrated and described without departing from the spirit of this invention and this invention shall be limited only by the appended claims.

What is claimed is:

1. In a fluid control valve, a casing having a plurality of parallel bores interconnected to connect the various components of said valve, the components of said valve including an inlet port, a check valve mounted in a first bore in said casing and said first bore connected to said pressure port, a main unloader poppet valve mounted in a second bore in said casing and also connected to said pressure port, said unloader poppet connected on its opposite side to an outlet port in said casing, an unloader pilot valve mounted in a third bore and connected on one side to the said check valve and connected on its opposite side to an adjustable orifice that is in turn connected to said first bore, a storage accumulator and fluid port in said casing connected to said check valve on one side and said port connected on the opposite side to a pilot operated "on off" valve, said pilot operated "on off" valve being mounted in a fourth bore, a main fluid motor port in said casing connected to said pilot operated "on off" valve, a control handle mounted in said casing to operate said pilot operated "on off" valve, a pressure relief valve mounted in a fifth bore in said casing, said relief valve connected to said pressure port, means to lift said main unloader poppet valve when a maximum fluid pressure has been charged into said first bore, means to discharge said excess fluid pressure until the fluid pressure in said first bore is reduced to a predetermined minimum when said main unloader poppet closes, means to dump the pressure maintaining said main unloader poppet valve balanced with said unloader pilot valve when said maximum pressure is reached in said first bore and the one side of said third bore connected with said check valve, means to close said unloader pilot valve when a predetermined minimum pressure is reached in said first bore and the one side of said third bore that is connected to said first bore, means to re-establish the balance on said main unloader poppet in a closed position, means to operate said control handle to open said pilot operated "on off" valve and charge fluid pressure from said accumulator storage means into the main motor port, and means to close said pilot operated "on off" valve.

2. In a valve according to claim 1, said valve mounted within a reservoir and having the control handle protruding through said reservoir wall so that said valve and casing is connected with the fluid to be utilized and said casing is immersed in the fluid that is discharged from said valve during the operation of said valve.

3. In a fluid control valve, a casing having a plurality of parallel bores interconnected to connect the various components of said valve, the components of said valve including a fluid pressure inlet port, a check valve mounted in a first bore in said casing and said first bore connected to said pressure port, a main unloader poppet valve resiliently mounted in a second bore in said casing and normally closed and also connected to said pressure port, said unloader poppet connected on its opposite side to an outlet port in said casing, an unloader pilot valve mounted in a third bore and connected on one side to the said check valve and connected on its opposite side to an adjustable orifice that is in turn connected to said first bore, a storage accumulator and fluid port in said casing connected to said check valve on one side and said port connected on the opposite side to a pilot operated "on off" valve, a rotatable control handle mounted in said casing to actuate a plunger which in turn opens said pilot operated "on off" valve, said valve balanced with the fluid pressure from said accumulator port, an adjustable pressure relief valve mounted in a fifth bore in said casing, said relief valve connected to said pressure port, said unloader pilot valve comprised of a ball poppet that is normally maintained on a valve seat by a resilient means and a diaphragm mounted on the opposite side of the valve from the resilient means, said diaphragm retaining a plunger that bears against said ball poppet in its closed position, means to distort said diaphragm and open said unloader pilot valve with a maximum fluid pressure which in turn dumps the fluid pressure on the opposite side of said pilot valve and the fluid pressure in the second bore that is retaining said main unloader poppet balanced, means to lift said main unloader poppet valve with a maximum fluid pressure in said first bore, means to discharge said excess fluid pressure past the main unloader poppet valve until the fluid pressure in said first bore is reduced to a predetermined minimum when said main unloader poppet closes, means to close said unloader pilot valve when a predetermined minimum pressure is reached in said first bore and the one side of said third bore that is connected to said first bore, means to pass fluid under pressure through said adjustable orifice to re-establish a balance on said main unloader poppet in its closed position, means to open said pilot operated "on off" valve and means to close said pilot operated "on off" valve.

4. In a valve according to claim 3, a relief valve connected to said pressure port so that any pressure above a predetermined maximum pressure will open said relief valve to discharge the excess pressure from the first bore of said casing.

5. In a fluid control valve, a casing having a plurality of parallel bores interconnected to connect the various components of said valve, the components of said valve including a fluid pressure inlet port, a check valve mounted in a first bore in said casing and said first bore connected to said pressure port, a main unloader poppet valve resiliently mounted in a second bore in said casing and normally closed and also connected to said pressure port, said unloader poppet connected on its opposite side to an outlet port in said casing, an unloader pilot valve mounted in a third bore and connected on one side to the said check valve and connected on its opposite side to an adjustable orifice that is in turn connected to said first bore, a storage accumulator and fluid port in said casing connected to said check valve on one side and said port connected on the opposite side to a pilot operated "on off" valve, said pilot operated "on off" valve being mounted in a fourth bore and normally closed, a main fluid motor port in said casing connected to said pilot operated "on off" valve, a rotatable control handle mounted in said casing to actuate a plunger which in turn opens said pilot operated "on off" valve, said valve balanced with the fluid pressure from said accumulator port, an adjustable pressure relief valve mounted in a fifth bore in said casing, said relief valve connected to said pressure port, said unloader pilot valve comprised of a ball poppet that is normally maintained on a valve seat by a resilient means, a yieldable diaphragm means mounted below said ball poppet and edging a piston inwardly against said ball poppet, said diaphragm compressible by the fluid in said third bore, means to compress said diaphragm and open said unloader pilot valve which in turn dumps the fluid pressure on the opposite side of said pilot valve and the fluid pressure in the second bore that is retaining said main unloader poppet balanced, means to lift said main unloader poppet valve with a maximum fluid pressure in said first bore, means to discharge said excess fluid pressure past the main unloader poppet valve until the fluid pressure in said first bore is reduced to a predetermined minimum when said main unloader poppet closes, means to close said unloader pilot valve when a predetermined minimum pressure is reached in said first bore and the one side of said third bore that is connected to said first bore, means to pass fluid under pressure through said adjustable orifice to re-establish a balance on said main unloader poppet in its closed position, means to open said pilot operated "on off" valve and means to close said pilot operated "on off" valve.

6. In a fluid control valve according to claim 5 in which a compressible diaphragm member is affixed in the third bore and is compressed or distorted to actuate said unloader pilot valve when a maximum fluid pressure acts upon said diaphragm.

JACK JEROME.

REFERENCES CITED

The following references are of record in the file of this patent:

UNITED STATES PATENTS

| Number | Name | Date |
|---|---|---|
| 2,214,817 | Harrington | Sept. 17, 1940 |
| 2,401,845 | Stephens | June 11, 1946 |
| 2,407,923 | Gall | Sept. 17, 1946 |